US012571563B2

(12) United States Patent
Scheffe et al.

(10) Patent No.: US 12,571,563 B2
(45) Date of Patent: Mar. 10, 2026

(54) SOLAR COLLECTION ENERGY STORAGE AND ENERGY CONVERSION OR CHEMICAL CONVERSION SYSTEM

(71) Applicant: University of Florida Research Foundation, Inc., Gainesville, FL (US)

(72) Inventors: Jonathan Scheffe, Gainesville, FL (US); James Arthur Trainham, Gainesville, FL (US); Bruce Cook, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 651 days.

(21) Appl. No.: 17/768,557

(22) PCT Filed: Oct. 16, 2020

(86) PCT No.: PCT/US2020/055867
§ 371 (c)(1),
(2) Date: Apr. 13, 2022

(87) PCT Pub. No.: WO2021/076823
PCT Pub. Date: Apr. 22, 2021

(65) Prior Publication Data
US 2023/0235924 A1 Jul. 27, 2023

Related U.S. Application Data

(60) Provisional application No. 62/916,524, filed on Oct. 17, 2019.

(51) Int. Cl.
*F24S 80/10* (2018.01)
*F24S 10/30* (2018.01)
(Continued)

(52) U.S. Cl.
CPC ............... *F24S 80/10* (2018.05); *F24S 10/30* (2018.05); *F24S 10/70* (2018.05); *F24S 20/20* (2018.05);
(Continued)

(58) Field of Classification Search
CPC .. C22C 27/04; C23C 4/02; C23C 4/06; C23C 4/067; C23C 4/134; F03G 6/061;
(Continued)

(56) References Cited

U.S. PATENT DOCUMENTS 9,884,367 B2   2/2018  Yamazaki et al.
2006/0285990 A1   12/2006  Jehanno et al.
(Continued)

FOREIGN PATENT DOCUMENTS

CN        104894448 A     9/2015
CN        109972081 A     7/2017

OTHER PUBLICATIONS

J. A. Lemberg and R. 0. Ritchie, Mo—Si—B Alloys for Ultrahigh-Temperature Structural Applications, Advanced Materials (2012), vol. 24, pp. 3445-3480.
(Continued)

*Primary Examiner* — Steven B McAllister
*Assistant Examiner* — Benjamin W Johnson
(74) *Attorney, Agent, or Firm* — Thomas Horstemeyer LLP.

(57) ABSTRACT

Provided are solar collection energy storage and energy conversion or chemical conversion systems. Also provided are tubing components, such as for solar receivers, including Mo and having a MoSiB coating on an external surface. The systems can include a solar receiver containing a heat transfer material or chemically reacting material and can operate at temperatures of 700° C. or higher. The solar receiver can include tubing components selected from a Mo
(Continued)

tubing component, a MAX phase material tubing component, a MoSiB composite tubing component, or a combination thereof. The Mo component, when present, can include a coating on surfaces of the Mo component that operate above 700° C.

15 Claims, 4 Drawing Sheets

(51) Int. Cl.

| | |
|---|---|
| *F24S 10/70* | (2018.01) |
| *F24S 20/20* | (2018.01) |
| *F24S 60/00* | (2018.01) |
| *F24S 80/20* | (2018.01) |
| *C22C 27/04* | (2006.01) |
| *C23C 4/02* | (2006.01) |
| *C23C 4/06* | (2016.01) |
| *C23C 4/067* | (2016.01) |
| *C23C 4/134* | (2016.01) |
| *F03G 6/06* | (2006.01) |

(52) U.S. Cl.

CPC .............. *F24S 60/00* (2018.05); *F24S 80/20* (2018.05); *C22C 27/04* (2013.01); *C23C 4/02* (2013.01); *C23C 4/06* (2013.01); *C23C 4/067* (2016.01); *C23C 4/134* (2016.01); *F03G 6/061* (2021.08); *Y02E 10/40* (2013.01)

(58) Field of Classification Search

CPC .. F24S 10/30; F24S 10/70; F24S 20/20; F24S 60/00; F24S 80/10; F24S 80/20; Y02E 10/40

USPC ......................................................... 126/676

See application file for complete search history.

(56) References Cited

U.S. PATENT DOCUMENTS

| | | | |
|---|---|---|---|
| 2014/0329073 A1 | 11/2014 | Barshilia et al. | |
| 2014/0373681 A1* | 12/2014 | Yamazaki | C22C 27/04 |
| | | | 75/352 |
| 2016/0197574 A1* | 7/2016 | Henry | H02S 10/20 |
| | | | 136/201 |
| 2016/0352282 A1* | 12/2016 | Lasich | F03G 6/001 |
| 2017/0067667 A1* | 3/2017 | Choi | F24S 60/10 |
| 2017/0241271 A1* | 8/2017 | Fried | C23C 28/322 |
| 2019/0157471 A1* | 5/2019 | Bahraini Hasani | C23C 4/10 |

OTHER PUBLICATIONS

ISR: PCT/US2020/055867, Oct. 16, 2020.

* cited by examiner (a) <t> = 1.8 microns (b) <t> = 3.5 microns (c) <t> = 7.3 microns (d) <t> = 14 microns

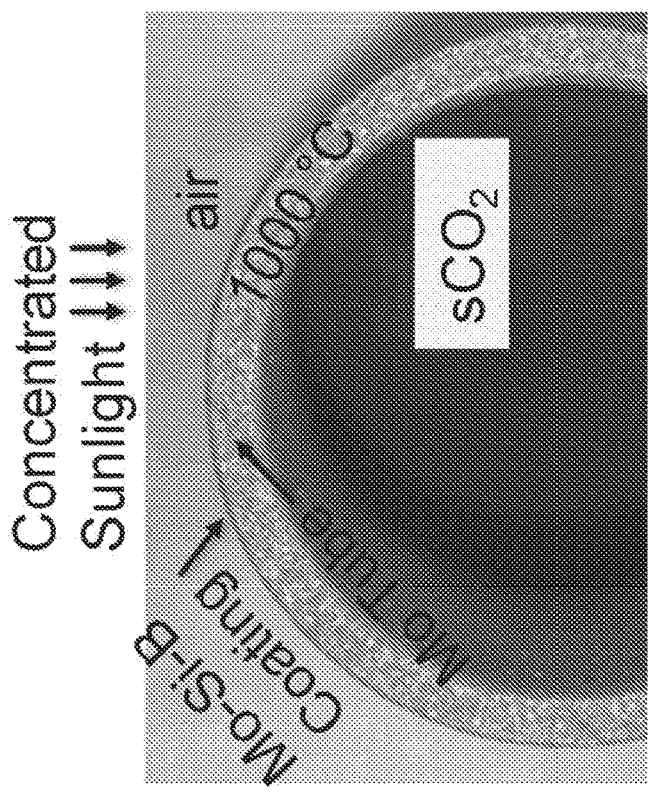
Fig. 4C
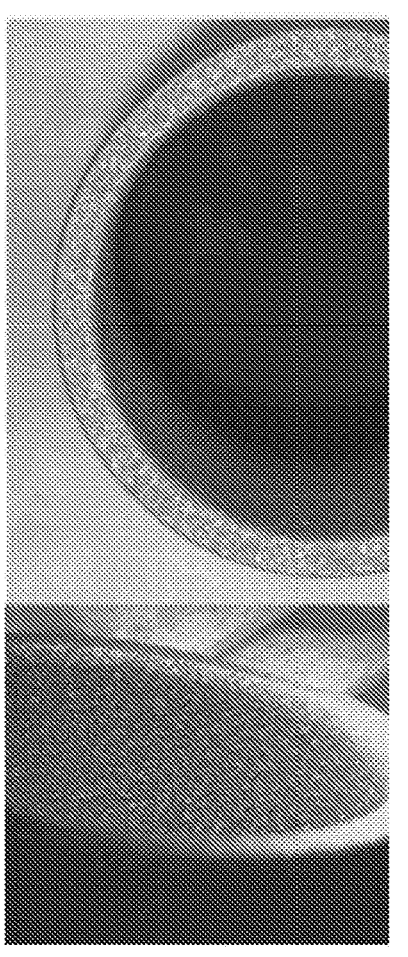
Fig. 4B
Fig. 4A

SOLAR COLLECTION ENERGY STORAGE AND ENERGY CONVERSION OR CHEMICAL CONVERSION SYSTEM

This application is the 35 U.S.C. § 371 national stage of PCT application having serial number PCT/US2020/055867, filed on Oct. 16, 2020. This application also claims priority to U.S. provisional application entitled "SOLAR COLLECTION ENERGY STORAGE AND ENERGY CONVERSION OR CHEMICAL CONVERSION SYSTEMS," having Ser. No. 62/916,524 filed on Oct. 17, 2019, which are entirely incorporated herein by reference.

BACKGROUND

Concentrated solar-thermal power (CSP) plants use molten salt storage and are limited to less than 600° C. because of salt decomposition. Gen3 CSP concepts will push the limits of material capabilities to temperatures between 700° C. and 800° C. and higher, where current receiver and piping materials such as nickel-based superalloys are not suitable. Most nickel-based superalloys melt at temperatures on the order of 1350° C. and exhibit a precipitous decrease in strength at significantly lower temperatures. These advanced metals also suffer from grain growth and mechanical creep with time leading to failure from a decrease in yield strength.

SUMMARY

Embodiments of the present disclosure provide solar collection energy storage and energy conversion systems, tubing components for solar receivers, methods of thermal spray coating solar receiver components, and the like.

An embodiment of the present disclosure includes solar collection energy storage and energy conversion or chemical conversion system. The system can include a solar receiver containing a heat transfer material or chemically reacting material. The solar receiver can operate at a temperature at about 700° C. or higher. The solar receiver can include tubing components selected from a Mo tubing component, a MAX phase material tubing component, a MoSiB composite tubing component, or a combination of the Mo tubing component, the MAX phase material tubing component, and the MoSiB composite tubing component. When the tubing component is Mo tubing, it can include a first coating on surfaces of the Mo tubing that do not contact the heat transfer material or chemically reacting material. The solar receiver can include at least one component that is a Mo component, a MAX phase material component, a MoSiB composite component or a combination of at least two of the Mo component, the MAX phase material component, and the MoSiB composite component. The Mo component, when present, can include a second coating on surfaces of the Mo component that operate above 700° C.

An embodiment of the present disclosure also includes tubing components, such as for solar receivers, wherein the tubing component includes Mo and wherein the tubing component includes a MoSiB coating on an external surface.

An embodiment of the present disclosure also includes methods of thermal spray coating a tubing component. The method can include synthesizing a composite material by solid state alloying, hot pressing or sintering the composite material to obtain a bulk solid, and grinding the bulk solid into powder having a grain size from about 30 μm to 100 μm. The powder can be applied using plasma spray application, and the powder can comprise MoSiB.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 3A) 4 hours; FIG. 3B) 25 hours; FIG. 3C) 100 hours; FIG. 3D) 400 hours. (Note: magnification is different for each image).

FIGS. 4A and 4B are photos of an oblique and an edge-on view, respectively, of a 19 mm diameter molybdenum tube after plasma spray application of Mo—Si—B. The coating is seen to be uniform and free from cracks. FIG. 4C illustrates the external Mo—Si—B coating on the Mo tube, where the tube delivers sCO$_2$.

Figure 1:
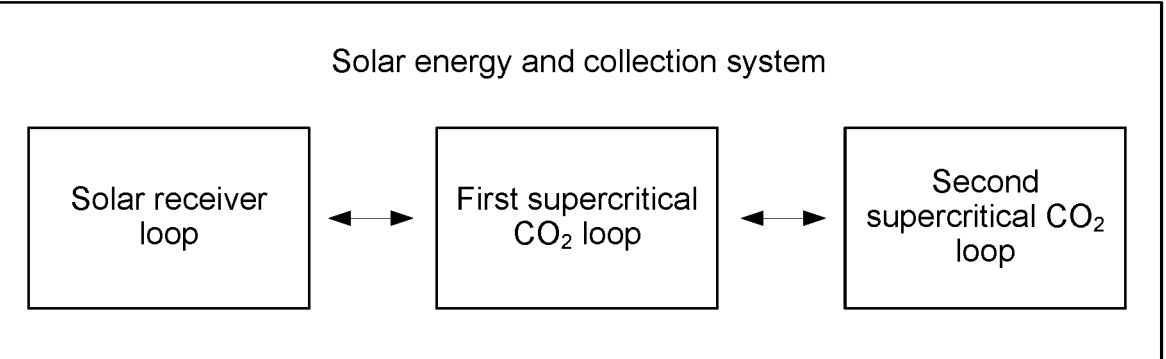
FIG. 1 is a block diagram generally illustrating the solar energy and collection system, in accordance with embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of material science, chemistry, physics, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of material science, chemistry, physics, and the like. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

Embodiments of the present disclosure provide for solar collection energy storage and energy conversion or chemical conversion systems that employ tubing components that can withstand the rigors (e.g., extreme temperatures, temperature fluctuation, in ambient air, and the like) of operation in a solar collection energy storage and energy conversion or chemical conversion system. In addition, other components (e.g., heat exchanger, pump, and the like) that are exposed to the extreme conditions can also be made of material to withstand the conditions. As a result, the solar collection energy storage and energy conversion or chemical conversion system can operate at higher temperatures which is advantageous over other systems.

The solar collection energy storage and energy conversion or chemical conversion system can be used to collect thermal energy that can be used to generate electric energy, chemical energy or use the thermal energy in another productive endeavor. In general, the solar collection energy storage and energy conversion or chemical conversion system can include a solar receiver containing a heat transfer material or chemically reacting material as well as other components typically used in such a system. The solar receiver operates at a temperature at about 700° C. or higher (e.g., about 700° C. to 1600° C. or about 1000° C. to 1600° C.). The solar receiver can include tubing components such as straight or curved tubing, a union, an elbow, a coupling, a valve, and the like, of various diameters depending upon the system. The tubing components can be made of various types of materials and include a Mo tubing component, a MAX phase material tubing component, a MoSiB composite tubing component, or a combination of the Mo tubing component, the MAX phase material tubing component, and the MoSiB composite tubing component. When present, the Mo tubing component includes a first coating (e.g., MoSiB composite coating) on surfaces of the Mo tubing that do not contact the heat transfer material or chemically reacting material.

In addition to the tubing components, the solar receiver includes at least one or more other components such as a solar receiver pump, a solar receiver heat exchanger, and the like. Each component can made of various materials and can include at least one of a Mo component, a MAX phase material component, a MoSiB composite component or a combination of at least two of the Mo component, the MAX phase material component, and the MoSiB composite component. When present, the Mo component can include a second coating (e.g., MoSiB composite coating) on surfaces of the Mo component that operate above 700° C. The solar receiver pump can include components such as the pump head, cooling jacket, external tube fittings, and the like. The solar receiver heat exchanger can include components such as, tubes, shell, external tube fittings, and the like.

The materials that the tubing components and the other components used in a solar receiver can be made of are selected so that they can withstand the extreme temperatures, temperature fluctuation, ambient air conditions, and the like that they will be exposed to during the operation of a solar collection energy storage and energy conversion or chemical conversion system. The tubing components and the other components described include those that are subject to the rigorous environment of the solar collection energy storage and energy conversion or chemical conversion system. Components that are not subject to this environment do not necessarily need to be made of these materials (e.g., Mo, MAX phase material, MoSiB composite and/or MoSiB composite coating) but can be made of them or other appropriate materials.

While the tubing components made of the materials such as Mo, MAX phase material, MoSiB composite and/or MoSiB composite coating are described in conjunction with solar receiver, tubing components can be used in other systems or methods that are subject to challenging and rigorous environments where extreme temperatures, temperature fluctuation, ambient air conditions, and the like may be involved. In this regard, tubing components as well as other components (e.g., pump heads, cooling jackets, fittings, tube fittings, shells, and the like) can be constructed using the materials as described herein (e.g., Mo, MAX phase material, MoSiB composite and/or MoSiB composite coatings).

The MoSiB composite and/or MoSiB composite coating have excellent high-temperature properties: 1) high strength; 2) creep and fatigue resistance; 3) oxidation, corrosion and erosion resistance in air and exposure to the various types of molten material that can be used. The MoSiB present in MoSiB composite and/or MoSiB composite coating has a nominal chemical stoichiometry $Mo_{0.46}Si_{0.35}B_{0.19}$ and has three distinct phases, $Mo_5Si_3$, $MoSi_2$ and MoB. The MoSiB composite coating can have a thickness of about 50 to 100 microns.

The MAX phase material composite can include a MAX phase material having the formula: $M_{n+1}AX_{n-y}$, where M is a transition metal, A is an A-group element, and X is carbon (C) and/or nitrogen (N), where M, A and X, independently, positions are occupied by 1 or more elements, n is 1 to 3, y is −0.5 to 0.5. In particular, the MAX phase materials can include: $Ti_2AlC$, $Ti_3SiC_2$, $Ti_3SnC_2$, or $Ti_3AlC_2$.

The heat transfer material or chemically reacting material can be a fluid, in particular, a molten metal. The heat transfer fluid can include lead, tin or bismuth a eutectic, or a molten salt. The eutectic material can include BiPb, LiBi, or LiPb. The molten salt can include KCl—$MgCl_2$, LiFNaFKF, or $KFBF_4$. In an aspect, the heat transfer fluid is chemically stable and does not boil from about 800-1600° C. The chemically reacting material can be a metal oxide, metal, carbonate, natural gas, coal, combustible solid, combustible gas, or other source of carbon (e.g. biomass, recycled plastics, MSW (municipal solid waste) and mixtures thereof). The metal oxides can be ceria or doped ceria materials, or perovskite oxides based on La—Mn—Sr—Al.

Now having described the solar collection energy storage and energy conversion or chemical conversion system in general, additional details will be provided. The solar collection energy storage and energy conversion or chemical conversion system can include the solar receiver described herein, which may be used to collect thermal energy that can be used to generate electric energy or chemical energy. The solar collection energy storage and energy conversion or chemical conversion system can have numerous configurations that include the solar receiver provided herein. In one embodiment, the solar collection energy storage and energy conversion or chemical conversion system can include a solar receiver loop (e.g., a closed system), a first supercritical fluid (e.g., He, noble gas (e.g., Ar), $CO_2$ ($sCO_2$)) loop, and a second supercritical fluid loop, where the solar receiver loop is in thermal communication with the first supercritical fluid loop and the first supercritical fluid loop is in thermal communication with the second supercritical fluid loop. The solar receiver loop can include solar receiver structures that include one or more solar power towers that collect sunlight by focusing concentrated solar radiation on a tower-mounted receiver. Solar power tower systems typically included one or more solar receivers and one or more heliostats that direct light onto the solar receiver. In particular, the solar receiver is typically positioned 50 feet to 400 feet or more above ground and is heated by sunlight directed onto it by the heliostats. Specifically, the heliostats (e.g., mirrors) redirect and concentrate solar radiation from the sun onto the solar receiver (e.g., to a temperature of about 500 to 1600° C.). The tubing components are in fluid communication with a solar receiver pump and a solar receiver heat exchanger. The heat transfer fluid material flows through tubing components of the solar receiver where it is heated by the concentrated solar energy.

In operation, heat transfer fluid may be flowed (e.g., pumped) to remove the thermal energy from the solar receiver, where the thermal energy is transferred via a heat exchanger to a power cycle or other process (e.g. fuel reforming). The solar receiver may also operate in batch mode with the tubing components containing static heat transfer fluid or chemical reacting component.

In one embodiment, a first supercritical fluid loop may be in thermal communication with the solar receiver loop via the solar receiver heat exchanger. The solar receiver heat exchanger is in thermal communication with the thermal energy from the molten material, which is transferred to first supercritical fluid in the first supercritical fluid loop. The first supercritical fluid loop is configured to transfer thermal energy between the first supercritical fluid and a thermal bed using a network of tubing, where the thermal energy is stored for future use. The first supercritical fluid loop operates at conditions above the critical point for supercritical fluid.

The thermal bed is not pressurized. The thermal bed can include a thermal material, where the thermal material can be rock, firebrick, or a combination thereof. The supercritical fluid in the first supercritical fluid loop and the second supercritical fluid loop is not directly exposed to the thermal material, rather the fluid flows through tubing components and the like.

The first supercritical fluid loop is in thermal communication with a second supercritical fluid loop, where the second supercritical fluid loop can use the stored thermal energy as thermal energy (e.g., chemical plant, to heat a fluid such as water, and the like) or converts the thermal energy to another usable energy source such as electricity (e.g., in a power plant). In an aspect, the second supercritical fluid loop can be a high temperature Brayton cycle that include compressor, turbine, heat exchanger or a high temperature chemical reactor system with heat exchangers.

The first supercritical fluid loop and/or second supercritical fluid loop can be based on the Brayton cycle, but doesn't have to be. The Brayton cycle can utilize a single-phase fluid operating near the critical temperature and pressure of such fluid, for example $CO_2$. Advantages of using the Brayton cycle can include: use of $CO_2$, small footprint as compared to systems currently used, high power density, and very efficient. Embodiments of the present disclosure using the Brayton cycle can achieve high efficiency and would be cost-effective when compared to other systems (e.g., steam-driven systems).

The second supercritical fluid loop can be based on the Brayton cycle, where the heat source is the solar receiver heat exchanger and the thermal bed, respectively for the first supercritical fluid loop and second supercritical fluid loop. The first supercritical fluid loop and second supercritical fluid loop are designed so that the respective heat source is configured to provide thermal energy (heat) to a single-phase fluid that flows through each system. In an exemplary embodiment, the fluid in the supercritical Brayton cycle comprises $CO_2$. Alternatively, the fluid can be a mixture of $CO_2$ and at least one other additive, which may be an alkane, Neon, Nitrogen, Helium, and the like. The mixture can be selected to cause the critical temperature of the fluid to be at a desired temperature, which can be selected based at least in part upon a sensed environmental condition pertaining to the first supercritical fluid loop and second supercritical fluid loop of the solar energy and collection system. The sensed environmental condition may be ambient temperature, day/night cycle conditions, seasonal temperatures, humidity, atmospheric pressure, and the like. $CO_2$ can be used and has a critical temperature of about 305 K, a critical pressure is of about 1070 psia (7.38 Mpa), where at this pressure the fluid density is very high (approximately 60% the density of water).

The disclosure provides for a solar collection energy storage and energy conversion or chemical conversion system, comprising a solar receiver containing a heat transfer material or chemically reacting material, wherein the solar receiver operates at a temperature at about 700° C. or higher; wherein the solar receiver comprises tubing components selected from a Mo tubing component, a MAX phase material tubing component, a MoSiB composite tubing component, or a combination of the Mo tubing component, the MAX phase material tubing component, and the MoSiB composite tubing component, wherein the Mo tubing, when present, includes a first coating on surfaces of the Mo tubing that do not contact the heat transfer material or chemically reacting material; wherein the solar receiver includes at least one component, wherein the at least one component is a Mo component, a MAX phase material component, a MoSiB composite component or a combination of at least two of the Mo component, the MAX phase material component, and the MoSiB composite component, wherein the Mo component, when present, includes a second coating on surfaces of the Mo component that operate above 700° C.

The disclosure provides for a system as above, wherein at least one component in the solar receiver includes a solar receiver pump, a solar receiver heat exchanger, or both.

The disclosure provides for a system as above, wherein the tubing component includes a union, an elbow, coupling, or a valve.

The disclosure provides for a system as above, wherein the MAX phase material comprises a MAX phase material having the formula: $M_{n+1}AX_{n-y}$, where M is a transition metal, A is an A-group element, and X is carbon (C) and/or nitrogen (N), where M, A and X, independently, positions are occupied by 1 or more elements, n is 1 to 3, y is –0.5 to 0.5.

The disclosure provides for a system as above, wherein the MAX phase materials is selected from $Ti_2AlC$, $Ti_3SiC_2$, $Ti_3SnC_2$, or $Ti_3AlC_2$.

The disclosure provides for a system as above, wherein the first coating and the second coating are independently selected from a MoSiB composite coating.

The disclosure provides for a system as above, wherein the heat transfer material is a heat transfer fluid.

The disclosure provides for a system as above, wherein the heat transfer fluid comprises a molten metal.

The disclosure provides for a system as above, wherein the heat transfer fluid comprises lead, tin or bismuth a eutectic, or a molten salt.

The disclosure provides for a system as above, wherein the eutectic is selected from BiPb, LiBi, or LiPb.

The disclosure provides for a system as above, wherein the molten salt is selected from $KCl$—$MgCl_2$, LiFNaFKF, or $KFBF_4$.

The disclosure provides for a system as above, wherein the heat transfer fluid is chemically stable and does not boil from about 800-1600° C.

The disclosure provides for a system as above, wherein the solar receiver operates at a temperature at about 700° C. to 1600° C.

The disclosure provides for a system as above, wherein the solar receiver operates at a temperature at about 1000° C. to 1600° C.

The disclosure provides for a system as above, wherein the solar receiver converts solar energy into thermal energy.

The disclosure provides for a system as above, wherein the solar receiver is part of a power plant, wherein the power plant is an electrical plant or a chemical plant.

The disclosure provides for a system as above, wherein the thermal energy is converted to electrical energy.

The disclosure provides for a system as above, wherein the thermal energy is converted to chemical energy.

The disclosure provides for a system as above, wherein the solar receiver heat transfer system is connected to thermal storage system through a heat exchanger that exchanges heat between the receiver heat transfer fluid and a secondary heat transfer fluid that is stable at temperatures above 700° C. comprising of super critical $CO_2$, Ar, or He.

The disclosure provides for a system as above, wherein the secondary heat transfer fluid is contained in the tubing components.

The disclosure provides for a system as above, wherein a heated tubing system in the thermal storage system heats rocks, castable refractory, or high temperature bricks to store solar energy.

The disclosure provides for a system as above, wherein the stored thermal energy is converted to either electrical energy or chemical energy.

The present disclosure provides for a tubing component, wherein the tubing component comprises Mo and wherein the tubing component comprises a MoSiB coating on an external surface.

The present disclosure provides for a tubing component as above, wherein the MoSiB coating has a thickness of about 50 to 100 microns.

The present disclosure provides for a tubing component as above, wherein the Mo is stabilized in air.

The present disclosure provides for a tubing component as above, wherein the tubing component includes a union, an elbow, coupling, or a valve.

The present disclosure provides for a tubing component as above, wherein the tubing component is stable at about 700° C. to 1300° C.

The present disclosure provides for a tubing component as above 3, wherein the tubing component has the characteristic of handling $sCO_2$, wherein the $sCO_2$ is at a temperature of about 700° C. to 1300° C.

The present disclosure provides for a tubing component as above, wherein the tubing component has a tensile strength of about 100 Mpa to 140 Mpa, or a tensile strength of 124 about Mpa at 1200° C.

The present disclosure also provides for a method of thermal spray coating a tubing component, comprising: synthesizing a composite material by solid state alloying; hot pressing or sintering the composite material to obtain a bulk solid; grinding the bulk solid into powder having a grain size from about 30 μm to 100 μm; and applying the powder using plasma spray application, wherein the powder comprises MoSiB.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Today, concentrated solar plants use solar salt storage and are limited to <600° C. because of salt decomposition. Liquid sodium HTF has been used, but fire is an issue.[8] On page 34 of the FOA[9] states, " . . . Gen3 CSP concepts, which may push the limits of material capabilities to temperatures between 700° C. and 800° C." and page 35, " . . . manufacturing based innovation is nickel based superalloys, which are the only commercially available materials appropriate for receivers and piping systems at high temperatures."

In contrast to the material systems described herein, most nickel-based superalloys (e.g., Hastelloy®, Inconel®) melt at temperatures on the order of 1350° C. and exhibit a precipitous decrease in strength at significantly lower temperatures. These advanced metals also suffer from grain growth and mechanical creep with time leading to failure from a decrease in yield strength. For example, the behavior of Inconel® 617 was simulated by Ansys Mechanical[10] for potential use in a solar receiver under conditions of thermal cycling to 1000° C., and its lifetime was shown to be severely limited by creep damage.[11] In addition, superalloys are susceptible to corrosion by molten metals Pb, Bi, LBE and Sn[6] and some molten salts[12] limiting the use of a wide variety of heat transfer fluids (HTF).

The use of liquid metals as a HTF medium in CSP offers numerous advantages, include high heat transfer coefficients. Molten Pb—Bi eutectic (LBE), for example, typically has heat transfer coefficients at least an order of magnitude greater than molten salts (~11,000 W/m2–K[14]). However, fouling at the wall-liquid interface has been a concern with some liquid metals and conventional Ni-based MOCs. Chemical or electrochemical interaction between the wall MOC and the HTF can produce a surface layer of intermetallics, carbides and other compounds with a lower thermal conductivity. Mass transfer and deposition of corrosion products are also possible on the heat exchanger surface. Molybdenum is generally regarded as being resistant to chemical fouling and exhibits negligible solubility for Pb. Ceramic solar receiver tubes made of mullite or alumina can withstand the high temperatures in an oxidizing atmosphere, and are corrosion resistant to molten metals and molten salts, but exhibit poor thermal shock resistance and are difficult to form because of their inherent brittleness and susceptibility to fracture. Graphite and SiC are more thermal shock resistant than mullite or alumina but oxidize in air.

This example introduces two new material system options for high temperature application in concentrated solar-thermal power (CSP). Both systems have the potential to significantly reduce the cost of receivers and piping systems relative to the nickel-based superalloys. The first system is molybdenum (Mo) stabilized in air with an oxidative resistant coating.[1,2] The second system is a MAX phase material (Max, layered ternary carbide or/and nitride compounds with general formula $M_{N+1}AX_N$ where M is an early transition metal, A is a Group IIIA or IVA element and X is C or N). In this example, the MAX phase material is Ti AlC.

In this example, materials developed to withstand the hostile environment of CSP systems present formidable challenges. Both candidate material systems exhibit excellent high-temperature properties: 1) high strength; 2) creep and fatigue resistance; 3) oxidation, corrosion and erosion resistance in air and exposure to a number of heat transfer fluids (HTF).

Refractory metals such as Mo offer the potential as an ideal material of construction (MOC) for high temperature CSP; however, they oxidize at relatively low temperatures, approximately 500° C., despite having melting points that exceed 2000° C. This oxidizing challenge is solved by coating Mo with a robust oxidation resistant MoSiB composite that stabilizes Mo in air. MoSiB composite coating on Mo was proposed for solar applications by Cook and Trainham,[1] while both were at RTI International. This initial work resulted in the successful ARPA-E project[2] DE-AR0000414 that delivered an optimized MoSiB composite coating for a solid particle solar receiver that required an abrasion resistant component. Air stabilized Mo offers many advantages as a MOC: 1) retention of strength even at high temperatures (tensile strength of 124 MPa at 1200° C.)[3] enabling thinner walls and lower cost; 2) a thermal conductivity on the same order of magnitude as steel, providing a reasonable heat transfer coefficient; and 3) corrosion resistance with molten salts[4] and molten metals Bi, Pb, LBE, and Sn[5, 6, 13]. It should be noted that the MoSiB coating has a conductivity similar to that of stainless steel, so its presence would have little effect on heat transfer.

The development of the high temperature (>700° C.) MOC systems—Mo with MoSiB coating, the MAX phase Ti₂AlC composite and the MoSiB composite—will provide new options for enhanced performance and efficiency by enabling CSP system to operate at higher temperatures and at reduced cost compared with existing nickel-based superalloys. These MOC systems offer flexibility in choice of HTF because of high corrosion resistance.

Figure 2:
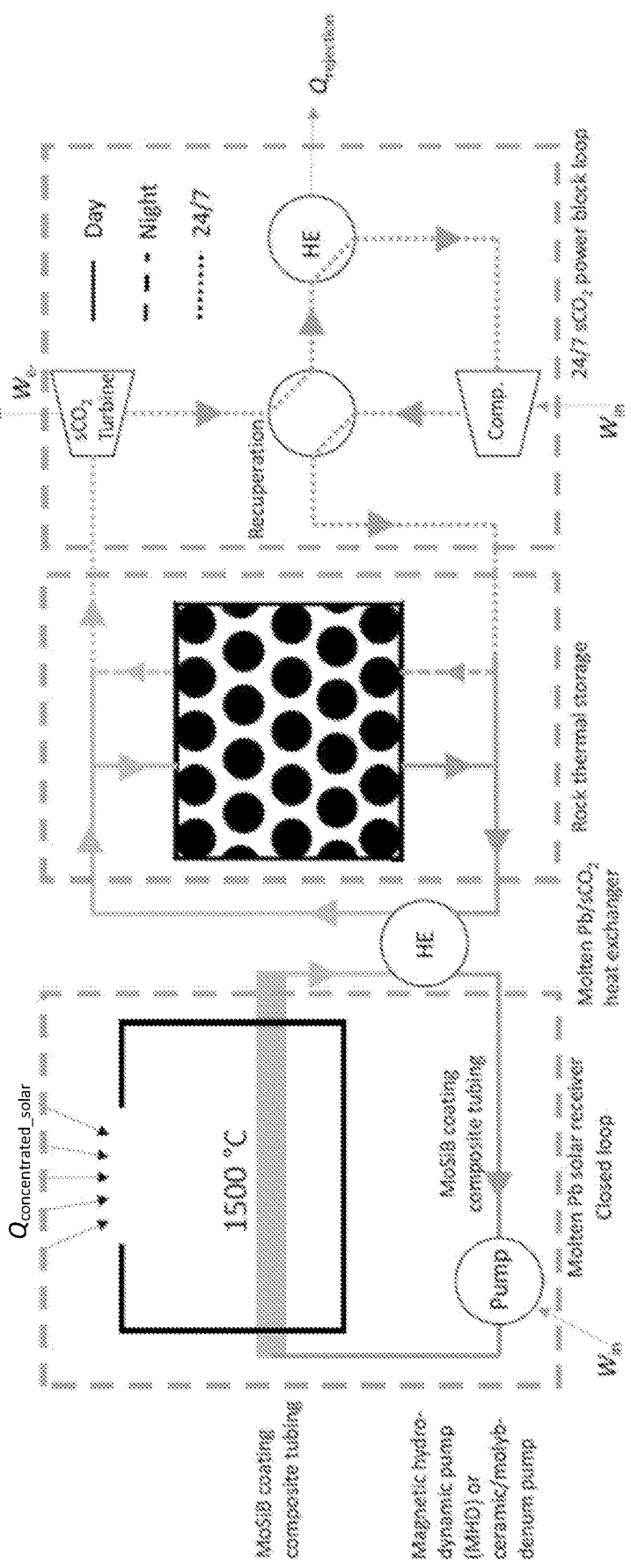
FIG. 2 illustrates a general Mo tubing setup as well as an sCO$_2$ tubing setup, in accordance with embodiments of the present disclosure.
Figures 3A, 3B, 3C, 3D:
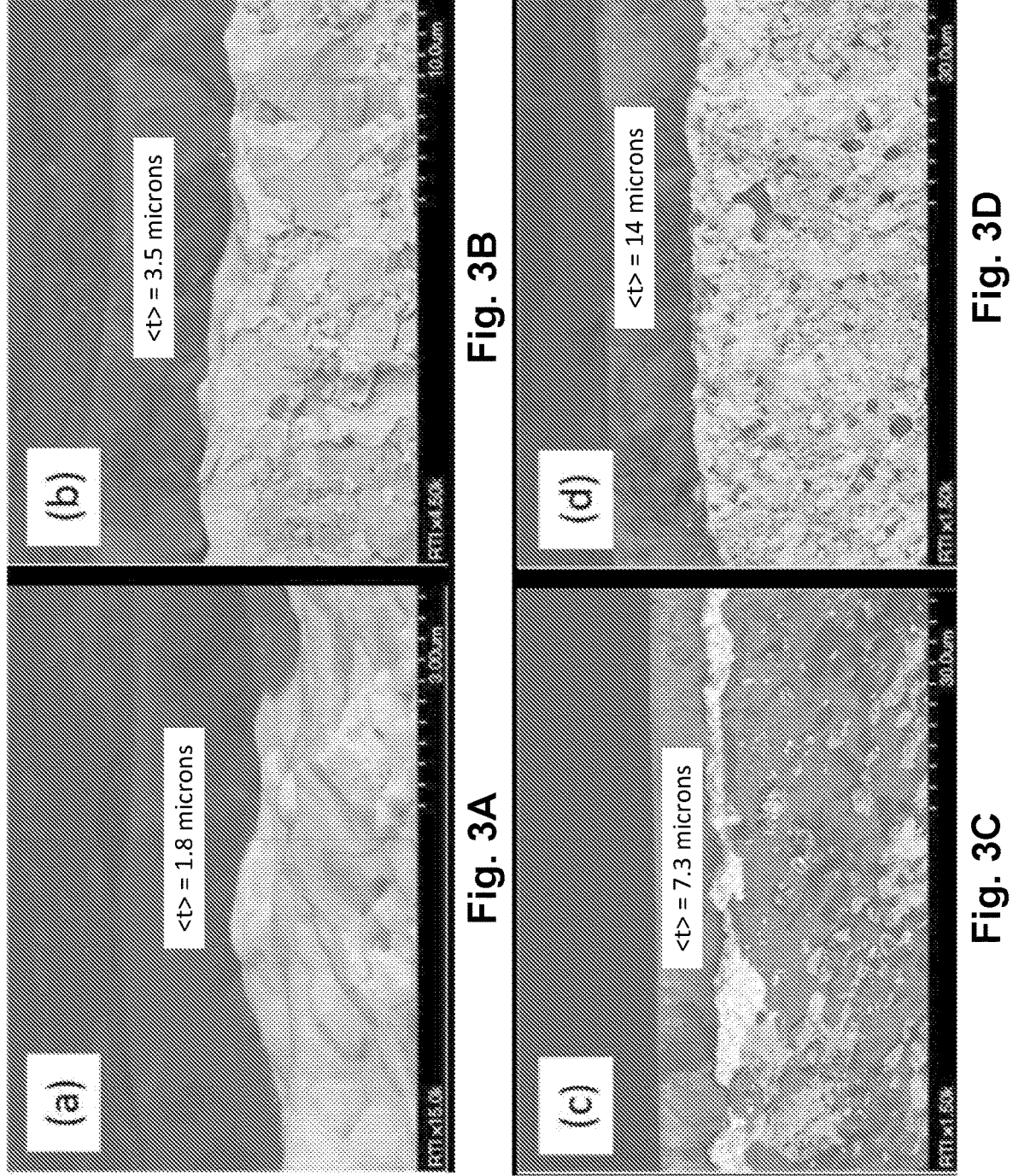
FIGS. 3A-3D are SEM-BSE images of protective Mo—Si—B (also represented as "MoSiB") coatings on Molybdenum after isothermal heat treatments at 1500° C. for varying lengths of time.

FIGS. 1 and 2 show conceptual schematics with three flow loops. FIG. 1 is a block diagram generally illustrating the solar energy and collection system while FIG. 2 provides a more detailed view illustrating general Mo tubing set up as well as sCO₂ tubing set up. The first loop is the solar receiver loop that collects the solar energy in the solar receiver that thermally communicates the thermal energy to the molten material (e.g., molten Pb). The receiver loop is the highest temperature loop, where the molten Pb is heated up by the solar receiver and pumped through the Mo tubing using the pump. The heat exchanger is in thermal communication with the first sCO₂ loop, where the thermal energy of the molten Pb is exchanged with the sCO₂. By design the molten Pb loop minimizes Mo tubing length and component size because of a very high heat transfer coefficient. All tubing and components are coated, which has a thermal conductivity comparable to stainless steel. The first sCO₂ loop exchanges heat with the thermal bed (e.g., low-cost solid rock or firebrick packed bed). The first sCO₂ loop will be operated at conditions above the critical point of CO₂, but not necessarily at the same pressure as the independent second sCO₂ loop where sCO₂ provides the energy to power a sCO₂ power plant or the temperature to drive chemical reaction, for example.

REFERENCES

[1] B. A. Cook, C. A. Bonino, J. A. Trainham, *Journal of materials science* 2014, 49, 7750.

[2] B. Cook, ARPA-E Contract No.: DE-AR0000414, "High Operating Temperature Transfer & Storage (HOTTS) System for Light Metal Production" Period of Performance: Feb. 5, 2014 to Feb. 4, 2017, Awardee: RTI International, ARPA-E Program Manager: James Klausner.

[3] R. P. Carreker, R. W. Guard, *JOM* 1956, 8, 178.

[4] B. G. D. Pi, J. Gray, 2013.

[5] R. N. Lyon, Committee on the Basic Properties of Liquid Metals, Office of Naval Research, 1952; A. K. Rivai, M. Takahashi, *Progress in Nuclear Energy* 2008, 50, 560; A. K. Rivai, M. Takahashi, *Journal of Nuclear Materials* 2010, 398, 139.

[6] L. R. Kelman, W. D. Wilkinson, F. L. Yaggee, Argonne National Lab. (ANL), Argonne, IL (United States), 1950.

[7] C. Anirudh, A. V. Vaibhav Koushik, U. N. Kempaiah, *International Journal of Emerging Technology and Advanced Engineering* 2014, 4, 624.

[8] N. Bartos, in *Asia-Pacific Solar Research Conference*, 2015.

[9] DOE, Office of Energy Efficiency and Renewable Energy (EERE), Solar Energy Technologies Office Fiscal Year 2019 Funding Program, Funding Opportunity Announcement (FOA) Number: DE-FOA-0002064.

[10] R. N. Wright, Idaho National Laboratory (INL), 2006.

[11] F. Tahir, S. Dahire, Y. Liu, *Materials Science and Engineering: A* 2017, 679, 391; G.-G. Lee, S. Jung, J.-Y. Park, W.-G. Kim, S.-D. Hong, Y.-W. Kim, *Journal of Materials Science & Technology* 2013, 29, 1177; S. F. Di Martino, R. G. Faulkner, S. C. Hogg, S. Vujic, O. Tassa, *Materials Science and Engineering: A* 2014, 619, 77.

[12] W. Ding, H. Shi, A. Jianu, Y. Xiu, A. Bonk, A. Weisenburger, T. Bauer, *Solar Energy Materials and Solar Cells* 2019, 193, 298; B. Liu, X. Wei, W. Wang, J. Lu, J. Ding, *Solar Energy Materials and Solar Cells* 2017, 170, 77.

[13] A. R. Petrova, V. G. Kaufman, L. M. Vdovina, Y. A. Shakhnes, *Metal Science and Heat Treatment* 1969, 11, 819.

[14] H. Benoit, L. Spreafico, D. Gauthier, G. Flamant, Renewable and Sustainable Energy Reviews 55(2016) 298-315

Example 2

Coating: The present example provides for Mo tubes stabilized in air with an oxidative resistant MoSiB outer coating that enables their use as a MOC for CSP systems up to 1350° C. and beyond, with $sCO_2$ as the heat transfer fluid. This work will demonstrate manufacturability of tubes and thermal stability in air while subjected these components to thermal cycling between 700° C. and 1350° C. Stability of the inner uncoated Mo tube surface can be validated by testing with $sCO_2$ between 700° C. and 900° C.

One attractive solution to development of new MOC's is to apply a compatible, oxidation-resistant coating onto a refractory metal-based MOC. Coatings based on phase assemblages within the Mo—Si—B ternary system offer a particularly promising solution for the use of molybdenum reaction tubes for high-temperature operations. Previous work provided support for determination of the thermodynamic properties, synthesis, and crystal structure of these materials. Many bulk compositions within the Mo—Si—B ternary phase space exhibit protective (parabolic) oxidation kinetics in an oxidizing atmosphere at temperatures approaching 1500° C. A review article by Lemberg and Ritchie[8] discusses individual phase constituents of structural composites based on T1 (Mo5Si3) and related mechanical properties. The Perepezko group successfully demonstrated the use of MoSiB as an oxidation-resistant surface treatment for tungsten up to 1400° C.[9] and investigated MoSiB pack cementation coatings for oxidation resistance in water vapor up to 1500° C.[10]. Akinc and coworkers[11] performed extensive experimental work on arc melted and hot pressed compositions within the T1 and neighboring phase fields.

Despite the progress to date, the complexity of the Mo—Si—B system offers opportunities for further optimization and experimental validation. MoSiB composites and composite coatings on Mo have been examined for solar applications, resulting in a MoSiB composite tube and an optimized MoSiB composite coating for a solid particle solar receiver that required an abrasion-resistant component. Extended duration high-temperature oxidation studies ranging from 100 to 500 hours at 1500° C. enabled direct measurement of the rate of scale growth, and calculation of the parabolic rate constant, 6.4×10–13 cm2/s, which achieved a 20+ year coating lifetime in the 1300° C. to 1500° C. temperature range. Representative SEM micrographs (BSE mode) of Mo—Si—B coating on Mo examined in air at 1500° C. for 4 to 400 h are shown in FIGS. 3A-3D. The oxide scale is shown in the upper portion of each micrograph, on top of the Mo—Si—B composite. The scale is seen to grow from a thickness of 1.4 microns at 4 hours to 14 microns after 400 hours.

Manufacturing of Coating: One of the challenges associated with the transferal of laboratory discoveries to industrial practice is the difficulty in scaling up the process while retaining the beneficial characteristics of the laboratory-scale samples. The most widely used generic coating approach for large-scale commercial products is thermal spray, which encompasses plasma, wire arc, D-gun, and HVOF (high-velocity oxy-fuel). Thermal spray involves melting feedstock powder, transporting the molten coating material to a substrate, followed by a rapid solidification of particle aggregates successively building up the protective coating. Presented here is a scalable approach to prepare Mo—Si—B powder feedstock for thermal spray coating. Briefly, the process first involves synthesis of the specific composite by solid state alloying and hot pressing or sintering, followed by comminution of the bulk solid into powder of the appropriate size range (30 to 100 μm), which consists of a series of grinding, sieving, and classification steps. Since the constituent components of the feedstock powder are all congruently-forming compounds (meaning solidification from a liquid result in formation of the same chemical stoichiometry), the solidified droplets were found to assume the same phase assemblage as that of the nominal feedstock material. FIGS. 4A and 4B are photos of an oblique and an edge-on view, respectively, of a 19 mm diameter molybdenum tube after plasma spray application of Mo—Si—B. The coating is seen to be uniform and free from cracks. FIG. 4C illustrates the external Mo—Si—B coating on the Mo tube, where the tube delivers $sCO_2$.

[8] J. A. Lemberg, R. O. Ritchie, *Adv. Mater.* 2012, 24, 3445.

[9] J. Lu-Steffes, R. Sakidja, J. Bero, J. H. Perepezko, *Surf. Coat. Tech.* 2012, 207, 614.

[10] J. H. Perepezko, R. Sakidja, *Oxid. Met.* 2013, 80, 207.

[11] M. Akinc, M. K. Meyer, M. J. Kramer, A. J. Thom, J. J. Huebsch, B. Cook, *Mat. Sci. Eng. A-Struct.* 1999, 261, 16; M. Meyer, M. Kramer, M. Akinc, *Adv. Mater.* 1996, 8, 85.

[13] K. J. Warren, Carrillo, R. J., Greek, B., Hill, C. M. and Scheffe, J. R., *Energy Technology* 2020.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A solar collection energy storage and energy conversion or chemical conversion system, comprising:
   a solar receiver containing a heat transfer material, wherein the solar receiver is configured to operate at a temperature at about 700° C. or higher;
   wherein the solar receiver comprises a Mo tubing component, wherein the Mo tubing component includes a first coating on surfaces of the Mo tubing component that do not contact the heat transfer material;
   wherein the first coating is a first MoSiB composite coating comprising three compounds of MoSiB: $Mo_5Si_3$, $MoSi_2$, and MoB;

wherein the solar receiver includes a Mo component, wherein the Mo component includes a second coating on surfaces of the Mo component that operate above 700° C.;

wherein the second coating is a second MoSiB composite coating comprising three compounds of MoSiB: $Mo_5Si_3$, $MoSi_2$, and MoB;

wherein the Mo tubing component comprises a Mo tube having the first coating, wherein the Mo tube is configured to flow heat transfer material in a first loop that includes a first section of the Mo tube that collects solar energy that thermally communicates the solar energy to the heat transfer material;

wherein the solar receiver is in thermal communication with a thermal storage system in a second section of the Mo tube through a heat exchanger that exchanges heat between the heat transfer material in the Mo tube in the first loop and a secondary heat transfer fluid in a second loop that is stable at temperatures above 700° C. and comprises super critical $CO_2$, Ar, or He;

wherein the thermal storage system comprises a heated tubing system and a thermal bed, wherein the secondary heat transfer fluid is contained in the heated tubing system, wherein the heated tubing system is configured to exchange heat with the thermal bed to store thermal energy, wherein the thermal bed comprises rocks, castable refractory, or high temperature bricks;

wherein the thermal storage system comprises a third section of the Mo tube in a third loop, wherein the third loop comprises a turbine, wherein the first loop and the third loop are separated by the second loop.

2. The system of claim 1, wherein at least one component in the solar receiver includes a solar receiver pump, a solar receiver heat exchanger, or both.

3. The system of claim 1, wherein the Mo tubing component further comprises a union, an elbow, coupling, or a valve.

4. The system of claim 1, wherein the heat transfer material is a heat transfer fluid.

5. The system of claim 4, wherein the heat transfer fluid comprises lead, tin, bismuth, BiPb, LiBi, LiPb, KCl—$MgCl_2$, LiFNaFKF, or $KFBF_4$.

6. A solar collection energy storage and energy conversion system, comprising:

a solar receiver containing a heat transfer material, wherein the solar receiver is configured to operate at a temperature at about 700° C. or higher, wherein the solar receiver converts solar energy into thermal energy;

wherein the solar receiver comprises a MoSiB composite tubing component;

wherein the MoSiB composite tubing component comprises three compounds of MoSiB: $Mo_5Si_3$, $MoSi_2$, and MoB;

wherein the solar receiver includes at least one MoSiB composite component;

wherein the MoSiB composite component comprises three compounds of MoSiB: $Mo_5Si_3$, $MoSi_2$, and MoB wherein the MoSiB composite tubing component comprises a MoSiB composite tube having a first coating, wherein the MoSiB composite tube is configured to flow heat transfer material in a first loop that includes a first section of the MoSiB composite tube that collects solar energy that thermally communicates the solar energy to the heat transfer material;

wherein the solar receiver is in thermal communication with a thermal storage system in a second section of the MoSiB composite tube through a heat exchanger that exchanges heat between the heat transfer material in the MoSiB composite tube in the first loop and a secondary heat transfer fluid in a second loop that is stable at temperatures above 700° C. and comprises super critical $CO_2$, Ar, or He;

wherein the thermal storage system comprises a heated tubing system and a thermal bed, wherein the secondary heat transfer fluid is contained in the heated tubing system, wherein the heated tubing system is configured to exchange heat with the thermal bed to store thermal energy, wherein the thermal bed comprises rocks, castable refractory, or high temperature bricks;

wherein the thermal storage system comprises a third section of the MoSiB composite tube in a third loop, wherein the third loop comprises a turbine, wherein the first loop and the third loop are separated by the second loop.

7. The system of claim 6, wherein the heat transfer material is a molten metal.

8. The system of claim 6, wherein the heat transfer material comprises lead, tin, bismuth, BiPb, LiBi, LiPb, KCl—$MgCl_2$, LiFNaFKF, or $KFBF_4$.

9. The system of claim 6, wherein the stored thermal energy is capable of being converted to either electrical energy or chemical energy.

10. A solar collection energy storage and/or chemical conversion system, comprising:

a solar receiver containing a heat transfer material, wherein the solar receiver is configured to operate at a temperature at about 700° C. or higher;

wherein the solar receiver comprises a tubing component selected from a Mo tubing component, a MAX phase material tubing component, a MoSiB composite tubing component, and a combination of the Mo tubing component, the MAX phase material tubing component, and the MoSiB composite tubing component, wherein the Mo tubing, when present, includes a first coating on surfaces of the Mo tubing that do not contact the heat transfer material;

wherein the MoSiB composite tubing component comprises three compounds of MoSiB: $Mo_5Si_3$, $MoSi_2$, and MoB;

wherein the first coating is a first MoSiB composite coating comprising three compounds of MoSiB: $Mo_5Si_3$, $MoSi_2$, and MoB;

wherein the solar receiver includes at least one component, wherein the at least one component is a Mo component, a MAX phase material component, a MoSiB composite component, or a combination of at least two of the Mo component, the MAX phase material component, or the MoSiB composite component, wherein the Mo component, when present, includes a second coating on surfaces of the Mo component that operate above 700° C., wherein the at least one component comprises a pump and a heat exchanger;

wherein the MoSiB composite component comprises three compounds of MoSiB: $Mo_5Si_3$, $MoSi_2$, and MoB; and wherein the second coating is a second MoSiB composite coating comprising three compounds of MoSiB: $Mo_5Si_3$, $MoSi_2$, and MoB wherein the tubing component comprises a tube having the first coating, wherein the tube is configured to flow heat transfer material in a first loop that includes a first section of the tube that collects solar energy that thermally communicates the solar energy to the heat transfer material;

wherein the solar receiver is in thermal communication with a thermal storage system in a second section of the tube in a second loop via the heat exchanger which exchanges heat between the heat transfer material in the tube and a secondary heat transfer fluid that is stable at temperatures above 700° C. and comprises super critical $CO_2$, Ar, or He;

wherein the thermal storage system comprises a heated tubing system and a thermal bed, wherein the secondary heat transfer fluid is contained in the heated tubing system, wherein the heated tubing system is configured to exchange heat with the thermal bed to store thermal energy, wherein the thermal bed comprises rocks, castable refractory, or high temperature bricks;

wherein the thermal storage system comprises a third section of the tube in a third loop, wherein the third loop comprises a turbine, wherein the first loop and the third loop are separated by the second loop.

11. The system of claim 10, wherein the at least one component is the MAX phase material component, wherein the MAX phase material component comprises a MAX phase material having a formula: $M_{n+1}AX_{n-y}$, where M is a transition metal, A is an A-group element, and X is carbon (C) and/or nitrogen (N), where M, A and X, independently, positions are occupied by 1 or more elements, n is 1 to 3, y is −0.5 to 0.5.

12. The system of claim 10, wherein the tubing component is selected from the Mo tubing component.

13. The system of claim 10, wherein the at least one component is the Mo component.

14. The system of claim 10, wherein the tubing component is selected from the MoSiB composite tubing component.

15. The system of claim 10, wherein the at least one component is the MoSiB composite component.

\* \* \* \* \*